(12) United States Patent
Nair

(10) Patent No.: US 11,282,047 B2
(45) Date of Patent: Mar. 22, 2022

(54) SYSTEM AND METHOD FOR PERFORMING GESTURE-BASED UNIFIED MULTI-MARKETPLACE TRANSACTIONS

(71) Applicant: PayPal, Inc., San Jose, CA (US)

(72) Inventor: Rahul Nair, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/997,550

(22) Filed: Aug. 19, 2020

(65) Prior Publication Data
US 2020/0410464 A1    Dec. 31, 2020

Related U.S. Application Data

(63) Continuation of application No. 15/702,242, filed on Sep. 12, 2017, now Pat. No. 10,776,763.

(51) Int. Cl.

| | |
|---|---|
| *G06Q 20/10* | (2012.01) |
| *G06Q 20/12* | (2012.01) |
| *G06Q 30/06* | (2012.01) |
| *G06F 3/04883* | (2022.01) |
| *G06F 3/01* | (2006.01) |
| *G06F 3/04817* | (2022.01) |
| *G06Q 30/02* | (2012.01) |
| *G06F 1/16* | (2006.01) |
| *G06F 21/31* | (2013.01) |
| *G06Q 20/32* | (2012.01) |
| *G06Q 20/20* | (2012.01) |
| *G07F 9/02* | (2006.01) |

(52) U.S. Cl.
CPC .......... *G06Q 20/10* (2013.01); *G06F 1/1694* (2013.01); *G06F 3/017* (2013.01); *G06F 3/04817* (2013.01); *G06F 3/04883* (2013.01); *G06F 21/31* (2013.01); *G06Q 20/12* (2013.01); *G06Q 20/20* (2013.01); *G06Q 20/327* (2013.01); *G06Q 30/0207* (2013.01); *G06Q 30/06* (2013.01); *G07F 9/02* (2013.01); *G06F 2203/04808* (2013.01)

(58) Field of Classification Search
CPC ....... G06Q 20/10; G06F 1/1694; G06F 3/017; G06F 3/04817; G06F 3/04883; G06F 21/31

See application file for complete search history.

(56) References Cited

U.S. PATENT DOCUMENTS 9,514,427 B2   12/2016   Taylor et al.
9,824,394 B1   11/2017   Boates et al.
(Continued)

*Primary Examiner* — Scott C Anderson
(74) *Attorney, Agent, or Firm* — Haynes and Boone, LLP

(57) ABSTRACT

Aspects of the present disclosure involve systems, methods, devices, and the like for processing a transaction. In one embodiment, a system is introduced that enables a communication between applications. The communication occurs through the use of one or more gestures that enable the request for information, funds, items for purchase and the like. In another embodiment, a system if introduced that enables a unified multi-marketplace communication. The communication includes the use of gestures for the transfer of information, funds, items for purchase, discounts, etc., using a unifying entity. The unifying entity can be a financial institution, payment provider, or the like that may be used to carry a transaction between applications allowing for a single checkout.

21 Claims, 7 Drawing Sheets

(56) References Cited

U.S. PATENT DOCUMENTS

| | | |
|---|---|---|
| 2008/0088602 A1 | 4/2008 | Hotelling |
| 2008/0268931 A1 | 10/2008 | Alderucci et al. |
| 2012/0191568 A1* | 7/2012 | Gandhi .............. G06Q 30/0633 |
| | | 705/26.8 |
| 2012/0306748 A1 | 12/2012 | Fleizach et al. |
| 2013/0073932 A1 | 3/2013 | Migos et al. |
| 2013/0317927 A1 | 11/2013 | Bush et al. |
| 2014/0095380 A1* | 4/2014 | Pinski ................. G06F 3/04842 |
| | | 705/39 |
| 2014/0380244 A1 | 12/2014 | Tecarro et al. |
| 2015/0269555 A1 | 9/2015 | Clark |
| 2015/0301797 A1 | 10/2015 | Miller |
| 2016/0055322 A1* | 2/2016 | Thomas .............. H04L 63/0876 |
| | | 726/7 |
| 2016/0275483 A1 | 9/2016 | Zhou |
| 2017/0031581 A1* | 2/2017 | Chilmulwar ........ G06F 3/04847 |
| 2017/0097687 A1* | 4/2017 | Pinault .................... G06F 3/017 |
| 2017/0337611 A1 | 11/2017 | Hsiao et al. |

\* cited by examiner

SYSTEM AND METHOD FOR PERFORMING GESTURE-BASED UNIFIED MULTI-MARKETPLACE TRANSACTIONS

CROSS-REFERENCE TO RELATED APPLICATIONS

This application is a continuation of U.S. patent application Ser. No. 15/702,242, filed Sep. 12, 2017, entitled "A SYSTEM AND METHOD FOR PERFORMING GESTURE-BASED UNIFIED MULTI-MARKETPLACE TRANSACTIONS", the disclosure of which is incorporated herein by reference in its entirety.

TECHNICAL FIELD

The present disclosure generally relates to marketplace transactions and more specifically, to systems for performing gesture-based marketplace transactions.

BACKGROUND

Rapid advancements in technology and communications have led to the ubiquitous use of wireless electronics. As such, today's society has grown to become heavily device reliant. This reliance has led to the use of electronics to make monetary transactions for goods and services. For example, a smartphone may now be used to complete a purchase transaction at an online marketplace or at a merchant location. Unfortunately, in some instances, the purchase transaction may require the user to leave one marketplace to complete a transaction at another marketplace. Additionally, the user may need to login and checkout at each marketplace. Such need for multiple logins and checkouts can lead to loss of time and money, as well as stress and frustration to a user. In addition, the transaction may be cancelled all together leading to a loss of funds for a merchant and more time from a consumer at a later time. Therefore, it would be beneficial if a system were created that provides user with the ability to perform multiple unified marketplace transactions.

Figure 1:
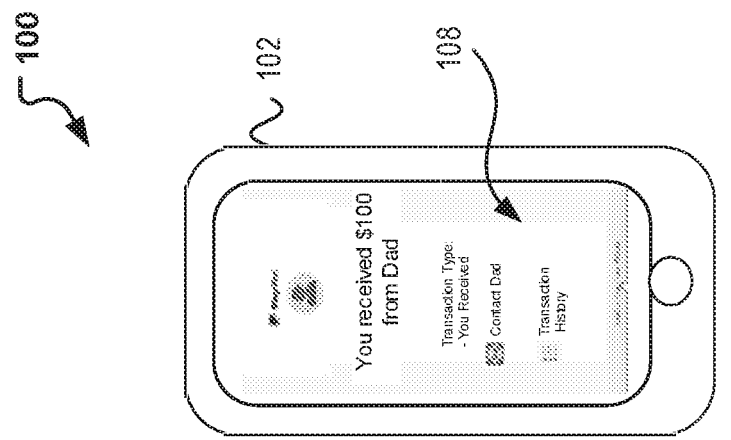
FIG. 1 illustrates block diagrams of user interactions with devices for completing a transaction.
Figure 1:
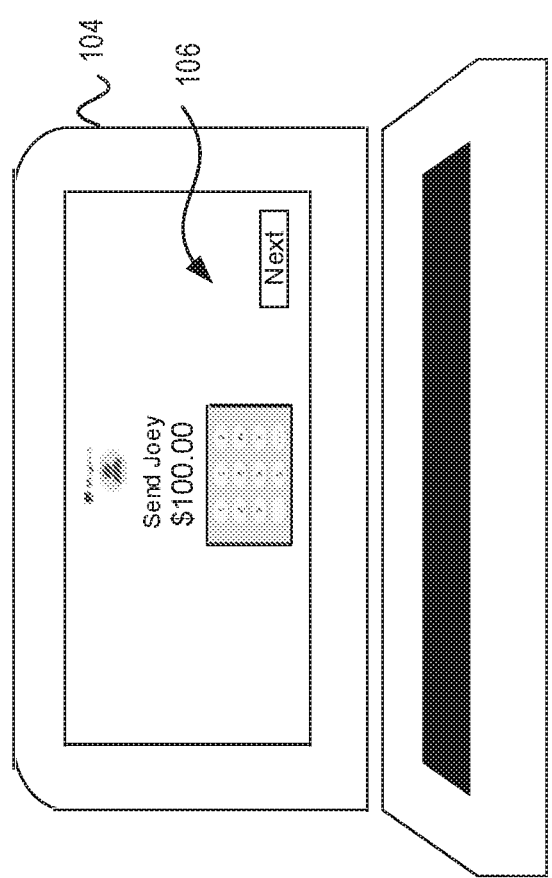

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for processing a transaction. In one embodiment, a system is introduced that enables a communication between applications. The communication occurs through the use of one or more gestures that enable the request for information, funds, items for purchase and the like. In another embodiment, a system if introduced that enables a unified multi-marketplace communication. The communication includes the use of gestures for the transfer of information, funds, items for purchase, discounts, etc., using a unifying entity. The unifying entity can be a financial institution, payment provider, or the like that may be used to carry a transaction between applications allowing for a single checkout.

Rapid advances in communications have made portable electronic devices, such as smartphones and tablets, part of everyday life. Among other things, these electronic devices can be used to browse the web, stream video, and purchase goods and services. In some instances, one or more electronic devices can be used to make the purchase. However, in some instances the purchase may require the use of multiple applications which may involve the login and checkout from each of the multiple applications.

For example, conventionally, a user may log into a bank application to transfer funds to another account. After the transfer, the user may then log into an e-commerce marketplace (e.g., Groupon®) to search for a discounted oil change service. Then, the user may go the merchant website to make an appointment for and purchase the service.

As another example, the user may begin searching for an item in one e-commerce marketplace site and in the process of purchasing, deciding to first check another merchant for a better deal. Checking with the other merchant can entail leaving the current site and performing another search.

As yet another example, the user may be interested in purchasing a new bookcase for his/her college dorm. The user may then message the parent to discuss the purchase, the parent logs into a corresponding bank account or payment provider to send funds to the user. The user would then wait for the funds to be deposited, log into the merchant and then make the purchase.

FIG. 1, illustrates this conventional method, where a secondary user is interacting with a personal device 104 for performing one or more transactions. The personal device 104 may be a tablet, laptop, pc, or the like. For exemplary purposes, personal device 104 can be a laptop. Generally, personal device 102 can be used for numerous tasks including but not limited to web browsing, video streaming, bill pay, and purchase of goods and services. FIG. 1 illustrates a UI 106 of a secondary user (e.g., Dad) having logged into a payment provider account (e.g., PayPal) for sending money to the user (e.g., Joey). In particular, Dad is sending Joey, via a PayPal application 106, $100 using his personal device 104.

FIG. 1 also illustrates another user interacting with a user device 102 for performing one or more transactions. The user device 102 may be a tablet, iPad, cell phone or the like. For exemplary purposes, user device 102 can be a smart phone. The smart phone may be equipped with various applications for performing similar tasks as indicated with personal device 104. For example, the user device 102 may be used for web browsing, video streaming, bill payments, and online purchases. Additionally, the user device 102 be equipped with applications that enable the user to make purchases using a payment provider application and/or a digital wallet. Further, the user device 102 is capable of making phone calls and communicating with one or more other communications devices using a cellular network, Wi-Fi, Bluetooth, BLE, NFC, WLAN, etc. The communication can enable the transmission of information from a user account to a secondary source. For example, the user device 102 can be used to make a purchase for a good or service using an application or digital wallet. FIG. 1 illustrates a UI 108 of the user (e.g., Joey) receiving a notification of the $100 transfer from Dad on his user device 102. Not illustrated is the wait for the deposit before the item is then again located and the purchase made. Although Joey did receive the funds and make the purchase, the series of transactions included a multi-step process that may add time, delay, and even frustration. In addition, such time delay may cause the user to postpone the purchase for another time or cancel all together.

In a current embodiment, a system is introduced that presents a gesture-based process that enables a user to communicate and transact over multiple-marketplaces using a unified provider. In particular, a system is introduced that enables a user to "jump" between marketplaces using a series of gestures that carry a transaction(s) through checkout in a simplified manner, all interconnected by a single entity.

Figure 2:
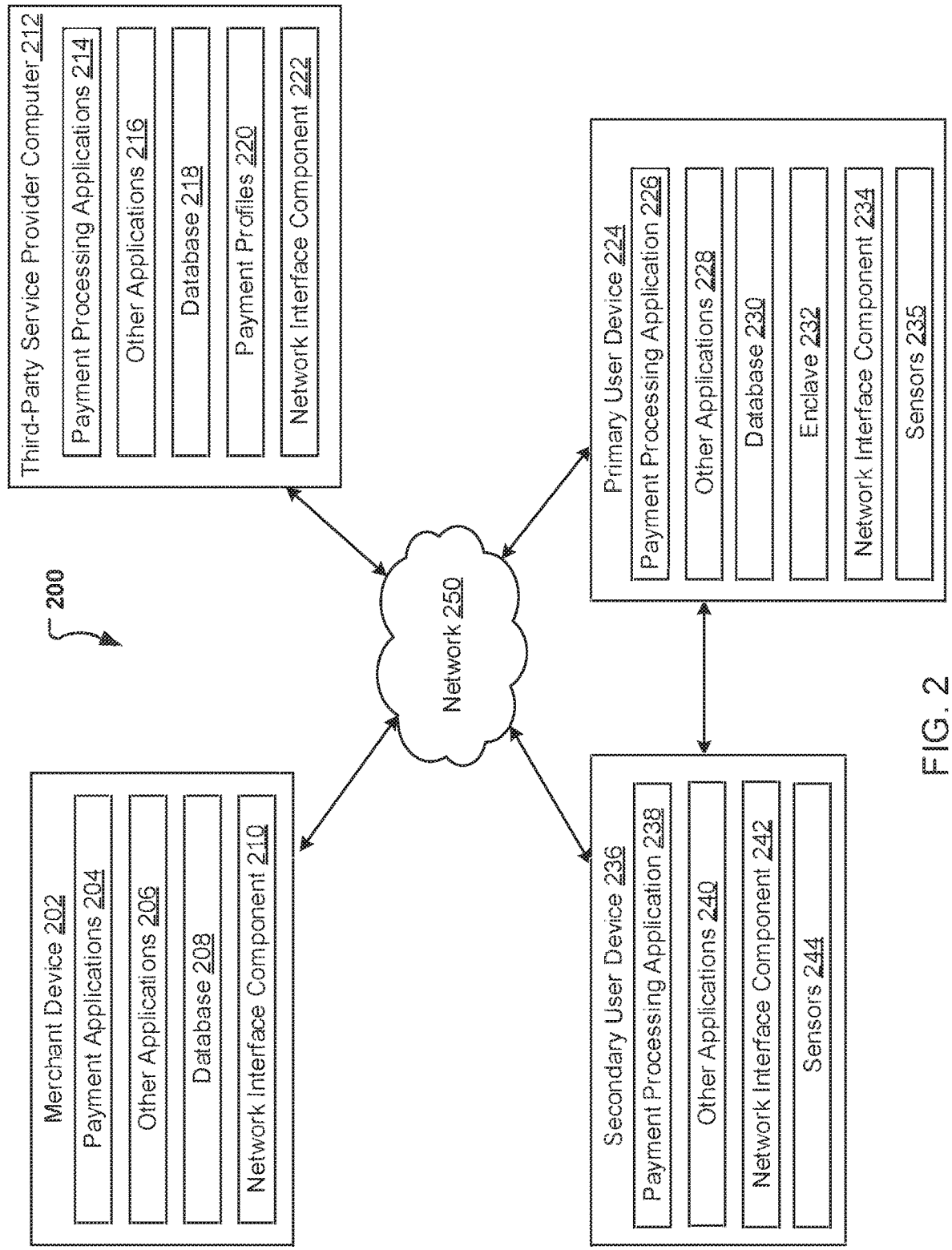
FIG. 2 illustrates a block diagram of a system for performing transactions.

Such system includes the communication and interaction between multiple users including but not limited to a primary user, secondary user, third party provider, and/or merchant. FIG. 2 is a block diagram of a networked system 200 for implementing the processes described herein, according to an embodiment. In particular, FIG. 2 illustrates a block diagram of a system 200 for completing transactions. System 200 illustrates at least some of the interactions between multiple entities and/or devices for the authentication, use and purchase of a product or service with a merchant in association with a service provider. As shown, system 200 may include or implement a plurality of devices, computers, servers, and/or software components that operate to perform various methodologies in accordance with the described embodiments. It will be appreciated that the devices, computers, and/or servers illustrated in FIG. 2 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 200 includes a merchant device 202, a primary user device 224 (e.g., user device 102), a third-party service provider computer 212, and a secondary user device 236 (e.g., personal device 104) in communication over a network 250. The merchant device 202, primary user device 224, third-party service provider computer 212, and the secondary user device 236 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 200, and/or accessible over network 250.

The merchant device 202 may be implemented as a communication device that may utilize appropriate hardware and software configured for wired and/or wireless communication with the primary user device 224, third-party service provider computer 212, and/or secondary user device 236. For example, the merchant device 202 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 202 may correspond to and be utilized by a user, such as an employee of a merchant and/or another person authorized by the merchant.

The merchant device 202 may include one or more payment applications 204, other applications 206, a database 208, and a network interface component 210. The payment applications 204 and other applications 206 may correspond to executable processes, procedures, and/or applications with associated hardware. In other embodiments, merchant device 202 may include additional or different components having specialized hardware and/or software to perform operations associated with the payment applications 204 and/or the other applications 206.

The payment application 204 may facilitate financial transactions corresponding to the sale of goods and/or services offered by the merchant. For example, the payment application 204 may provide an interface for customers to purchase the goods or services and to receive customer payment information (e.g., customer credit card information). The payment application 204 may further transmit customer payment information to a payment processor (e.g., such as a payment processor corresponding to the third-party service provider computer 212 or the secondary user device 236) to process the customer payment information. The payment application 204 may also facilitate other types of financial transactions such as banking, online payments, money transfer, and/or the like.

The merchant device 202 may execute the other applications 206 to perform various other tasks and/or operations corresponding to the merchant device 202. For example, the other applications 206 may include security applications for implementing client-side security features, programmatic client applications for interfacing with appropriate application programming interfaces (APIs) over network 250, or other types of applications. The other applications 206 may also include additional communication applications, such as email, texting, voice, and instant messaging (IM) applications that enable a user to send and receive emails, calls, texts, and other notifications through the network 250. In various embodiments, the other applications 206 may include location detection applications, such as a mapping, compass, and/or global positioning system (GPS) applications, which may be used to determine a location of the merchant device 202. The other applications may 206 include social networking applications. Additionally, the other applications 206 may include device interfaces and other display modules that may receive input and/or output information. For example, the other applications 206 may include a graphical user interface (GUI) configured to provide an interface to the user and enable the use of one or more features for completing transactions between marketplaces.

The merchant device 202 may further include a database 208, which may be stored in a memory and/or other storage device of the merchant device 202. The database 208 may include, for example, identifiers (IDs) such as operating system registry entries, cookies associated with the payment application 204, tokens, encryption keys, and/or other applications 206, IDs associated with hardware of the network interface component 210, IDs used for payment/user/device authentication or identification, and/or other appropriate IDs. The database 208 may also include information corresponding to one or purchase transactions of customers who have purchased goods or services from the merchant, browsing histories of the customers, or other types of customer information. In certain embodiments, the merchant device 202 may also include information corresponding to payment tokens, such as payment tokens generated by the third-party service provider computer 212 and/or generated by the secondary user device 236.

The merchant device 202 may also include at least one network interface component 210 configured to communicate with various other devices such as the primary user device 224, the third-party service provider computer 212, and/or the secondary user device 236. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 212 may be maintained, for example, by a third-party service provider, which may provide payment processing services for the merchant. In one example, the third-party service provider may be provided by PAYPAL®, Inc. of San Jose, Calif., USA. Alternatively, the third-party service provider computer 212 may be associated with a user of the user device 102 and/or personal device 104. As such, the third-party service provider computer 212 includes one or more payment processing applications 214, which may be configured to process payment information received from the merchant device 202 or from a selection at the user device 102 and/or personal device 104. For example, the payment application 204 of the merchant device 202 may receive payment information from a customer to purchase a service or good offered by the merchant. Upon receipt of the payment information, the payment application 204 may transmit the payment information to the third-party service provider computer 212. The payment processing application 214 of the third-party service provider computer 212 may receive and process the payment information. As another example, the payment application 204 can present a payment code on a display of the user device 102 associated with the merchant. The payment code can be scanned or transmitted to the merchant device 202 for payment processing. Still in another example, the payment provider may include an icon that may be squeezed, swiped, tapped, or other for the processing of a transaction.

The third-party service provider computer 212 may execute the other applications 216 to perform various other tasks and/or operations corresponding to the third-party service provider computer 212. For example, the other applications 216 may include security applications for implementing client-side security features, programmatic client applications for interfacing with appropriate APIs over the network 250, or other types of applications. The other applications 216 may also include additional communication applications, such as email, texting, voice, and IM applications that enable communication of emails, calls, texts, and other notifications through the network 250. In various embodiments, the other applications 216 may include location detection applications, such as a mapping, compass, and/or GPS applications, which may be used to determine a location of the third-party service provider computer 212. Additionally, the other applications 216 may include device interfaces and other display modules that may receive input and/or output information. For example, the other applications 216 may include a GUI configured to provide an interface to one or more users (including gestures).

The third-party service provider computer 212 may further include a database 218, which may be stored in a memory and/or other storage device of the third-party service provider computer 212. The database 218 may include, for example, IDs such as operating system registry entries, cookies associated with the payment processing application 214 and/or other the applications 216, IDs associated with hardware of the network interface component 222, IDs used for payment/user/device authentication or identification, and/or other appropriate IDs.

According to a particular embodiment, the third-party service provider computer 212 may include a set of payment profiles 220 corresponding to past sales transactions executed by the merchant device 202 with respect to one or more customers of the merchant. Alternatively, the third-party service provider computer 212 may include a set of merchant payment profiles corresponding to the payment sources associated to a corresponding merchant. For example, a particular payment profile from the set of payment profiles 220 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer. Furthermore, other payment profiles of the set of payment profiles 220 may include payment information corresponding to other customers of the merchant and/or other merchants associated with the user. In addition, the third-party service provider computer 212 may store the set of payment profiles 220 according to a first file format.

The third-party service provider computer 212 may also store a set of payment tokens corresponding to the set of payment profiles 220. For example, each payment profile of the set of payment profiles 220 may be associated with a corresponding payment token from the set of payment tokens. In some embodiments, each payment profile may include a corresponding payment token from the set of payment tokens. The set of payment tokens may be particular to the third-party service provider computer 212 (e.g., computers from other service providers may be unable to use the set of payment tokens) and may enable the merchant device 202 to more securely process payment transactions with the third-party service provider computer 212. For example, in order to process a payment transaction that involves a credit card number associated with a particular payment profile, the third-party service provider computer 212 may provide the merchant device 202 with a particular payment token that is different from the credit card number. The merchant device 202 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 202.

In various embodiments, the third-party service provider computer 212 also includes at least one network interface component 222 that is configured to communicate with the merchant device 202, the primary user device 224, and/or the secondary user device 236 via the network 250. Further, the network interface component 222 may comprise a DSL modem, a PSTN modem, an Ethernet device, a broadband device, a satellite device and/or various other types of wired and/or wireless network communication devices including microwave, RF, and IR communication devices.

The primary user device 224 may be implemented as a communication device that may utilize appropriate hardware and software configured for wired and/or wireless communication with the merchant device 202, third-party service provider computer 212, and/or the secondary user device 236. The primary user device 224, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 224 may be user device 102 communicating with personal device 104, a merchant device and/or service provider 212.

The primary user device 224 may include a payment processing application 226 that may be used as a digital wallet that can communicate with a merchant device 202, secondary user device 236, and/or third party service provider 212 for purchasing and transacting. The payment processing application 226, can work jointly with database 230 for retrieving bank account information, user accounts, security codes, tokens that may be associated with various merchant locations. Similarly, the payment processing application, can also provide access to the user profiles for determining which payment method, processing code, to use at a merchant location. The primary user device 224 may include an enclave 232 which can be a secure hardware level storage are designated for the payment processing application 226. The enclave 232 can enable the storage of private and public keys and a randomly generated token that enables the secure communication and validation of the user of the payment processing application with the third party service provider 212.

The primary user device 224 may also include other applications 228 to perform various other tasks and/or operations corresponding to the primary user device 224. For example, the other applications 228 may facilitate communication with the merchant device 202, such as to receive an indication, from the merchant device 202, to switch payment processing services from the third-party service provider to the service provider. As another example, the other applications 228 may include security applications, application that enable designation of a primary interactive device, and applications that allow for web site searches (including access to merchant websites). The other applications 228 may also include additional communication applications, such as email, texting, voice, and IM applications that enable communication of emails, calls, texts, and other notifications through the network 250. In various embodiments, the other applications 228 may include location detection applications, such as a mapping, compass, and/or GPS applications, which may be used to determine a location of the user device 224. The other applications may 228 social networking applications. Additionally, the other applications 228 may include device interfaces and other display modules that may receive input and/or output information. For example, the other applications 228 may include a GUI configured to provide an interface to one or more users.

The primary user device 224 may further include a database 230, which may be stored in a memory and/or other storage device of the primary user device 224. The database 230 may include, for example, identifiers (IDs) such as operating system registry entries, cookies associated with a web browser and/or the other applications 228, IDs associated with hardware of the network interface component 234, IDs used for payment/user/device authentication or identification, bank information, merchant information, user accounts, and/or other appropriate IDs. In addition, the database 230 may include user identifier information which can be used in conjunction with secondary user device 236 during an explicit code exchange and/or contextual information for web browser authentication. Further, the database 230 may include user selected gestures for the authentication, and processing of transactions.

Primary user device 224, can also be equipped with various sensors 234 to provide sensed characteristics about the primary user device 224 and its environment. For example, the sensors 234 can include a camera for taking images of the surroundings used to determine the information to provide a user (e.g., camera used for scanning a QR code or scanning a user eye/pupil or other biometric). As another example, the sensors 234 can include microphones for receiving audio signals which can be used to detect location, and other relevant terms that may be spoken. Further, the sensors 234 can include an accelerometer, a light sensor, a biometric sensor, temperature sensor, etc. For example, the biometric sensor can be used to collect a user fingerprint scan. Each type of sensor providing various characteristics about the device, user, or environment.

The primary user device 224 may also include at least one network interface component 210 configured to communicate with various other devices such as the merchant device 202, the third-party service provider computer 212, and/or the secondary user device 236. In various embodiments, network interface component 234 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

As indicated above, a secondary user device 236 (e.g., personal device 104) may be presently available and used by a consumer (e.g., user). The secondary user device 236, much like the primary user device may be equipped with payment processing applications 238 as well as other applications 240. The payment processing applications 238 and other applications 240 may be used to perform various tasks and/or operations corresponding to the secondary user device 236. The other applications 228 may include additional communication applications, such as email, texting, voice, and IM applications that enable communication of emails, calls, texts, and other notifications through the network 250. In addition, the other applications 228 may include location detection applications, such as a mapping, compass, and/or GPS applications, which may be used to determine a location of the secondary user device 236. The other applications may further include 228 social networking applications and device interfaces and other display modules that may receive input and/or output information For example, the applications 238, 240 may facilitate communication with the merchant device 202, such as by presenting a QR code that may be used for making a purchase. Communicate a gesture received, a code scanned, a movement of a device detected may also be facilitated through the communication using applications 238,240. As another example, the applications 238, 240 may provide notice of an incoming call or text to the user 106 of the secondary user device 236. Still as another example, the applications 238,240 can provide details and/or login information for authentication by the primary user device 224.

The secondary user device 236 may also include a network interface component 242 for connecting and interacting with at least primary user device 224, merchant user device 202, and/or third-party service provider computer 212 over network 250. The network interface component 242 may comprise a DSL modem, a PSTN modem, an Ethernet device, a broadband device, a satellite device and/or various other types of wired and/or wireless network communication devices including microwave, RF, and IR communication devices.

The network 250 may be implemented as a single network or a combination of multiple networks. For example, in various embodiments, the network 250 may include the Internet or one or more intranets, landline networks, wireless networks, and/or other appropriate types of networks. Thus, the network 250 may correspond to small scale communication networks, such as a private or local area network, or a larger scale network, such as a wide area network or the Internet, accessible by the various components of system 200.

In addition, the secondary user device 236 can also include sensors 244 that may be used for providing measured information about the user, device, location, environment, etc. The sensors can be used to detect light (is device in a pocket), biometric data (is user working out), location (user is in a meeting, call received), etc. Further, the sensors 244 can also be used to determine proximity between devices and location of interest as well as determine processor usage and/or signal strength which may be used to characterize the device for determining the interaction state of the secondary user device 236.

Figure 3:
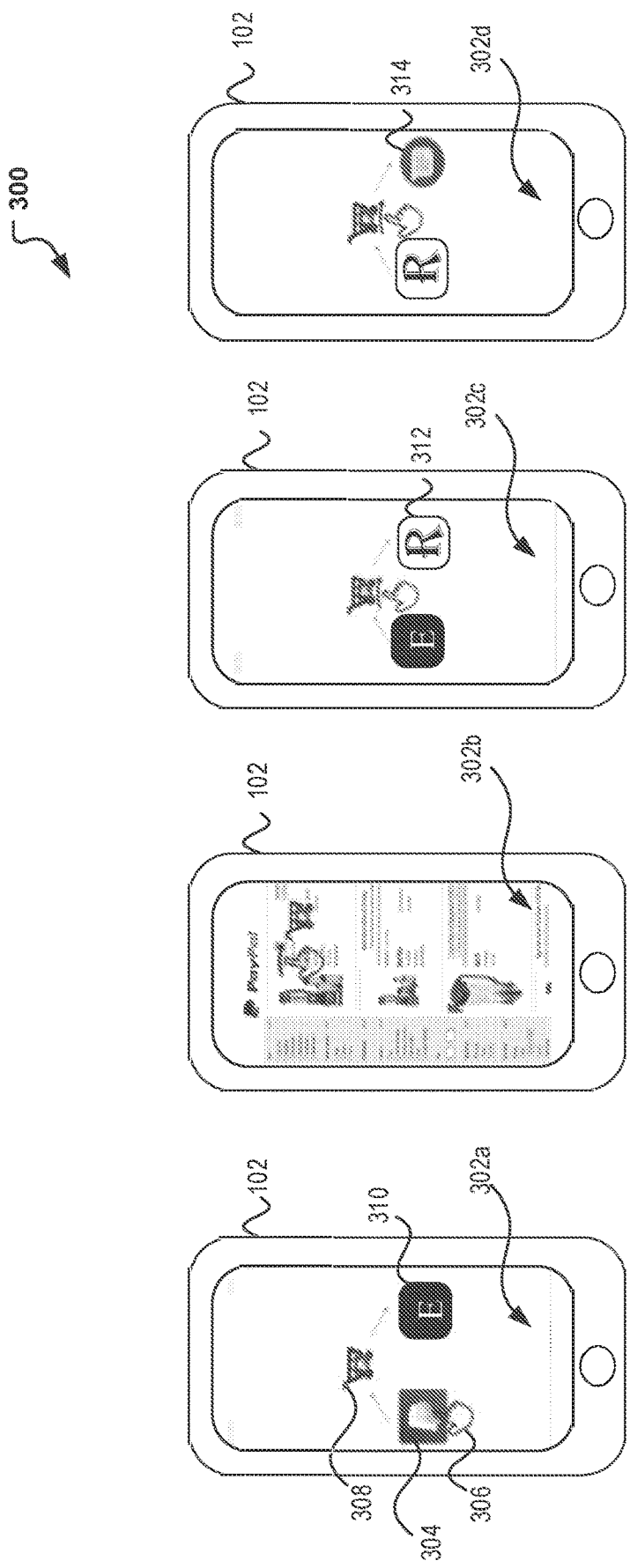
FIG. 3 illustrates a communication for performing unified multi-marketplace transactions.

FIGS. 3-5 provide exemplary embodiments illustrating a communication over a user device 104 for unified multi-market place transactions. Note that FIGS. 3-5 are for exemplary purposes only and other methods, flows, and user interfaces may be contemplated. In addition, although the process is illustrated as beginning at the user device 102, the process of beginning the transaction may occur at an ATM, merchant location, personal device 104, etc. Additionally, the transactions may occur on a single device, a combination of two or more devices and/or between two or more devices.

FIG. 3 illustrates a communication for performing unified multi-marketplace transactions. In particular, FIG. 3 illustrates a communication 300 over a user device 102 for marketplace transactions. For exemplary purposes, a PayPal application will be used as the unifying entity allowing multi-marketplace transactions. Communication 300 will generally include a series of user interfaces illustrating the various transactions and communications.

In some embodiments, the communication 300 begins with a user device 102 in a home state UI 302a. At home state UI 302a, the user may interact with one or more applications for performing the desired transaction. The transaction as presented by the unified system includes the home state UI 302a, illustrating a user who desires to perform a transaction at an e-commerce marketplace site (e.g., Ebay) using his/her payment provider account (e.g., PayPal account). As illustrated in FIG. 3, the transaction is initiated at the payment provider account icon 304, with a gesture 306 on the account (e.g., a tap and swipe gesture) which selects the PayPal icon 304 and causes the generation of a shopping cart 306. The shopping cart 306 becoming the representation of the account which can be used at the end for checkout. In one embodiment, the shopping cart 306 is swiped into the e-commerce marketplace icon 310 for browsing and/or transacting.

Note that other methods of retrieving the cart may exist, for example, the payment provider account icon 304 may be tapped/pressed causing the shopping cart to "pop out", which may then be swiped into the e-commerce marketplace icon 310.

Once at the e-commerce marketplace, the user may freely search, compare, purchase, cart, etc. an item of interest. As illustrated in commerce UI 302b, the user may search for an item of interest, browse various products, purchase or simply cart an item for purchase. In some embodiments, the user may decide to purchase and checkout from the e-commerce site using the payment provider account that is represented by the cart 308. To checkout, a gesture including but not limited to a click, a swipe, a tap and/or a biometric such as a fingerprint, eye scan, etc. may be used. In a current embodiment, a user may cart the item for purchase and then proceed to another marketplace for further browsing, item comparison, or search for related vouchers or discount codes. As illustrated in UI302c, the user may proceed to a discount e-commerce marketplace 302 (e.g., Groupon) for related discounts, coupons, or product comparisons. To proceed to the discount e-commerce marketplace 302, the user may return to home state UI302c and enter the discount e-commerce marketplace using a swipe or other gesture. Alternatively, the user may enter the discount e-commerce marketplace by applying the gesture on the current commerce UI302b which minimizes and illustrates the other applications available for continuing the unified multi-marketplace transaction.

At the discount e-commerce marketplace site, the user may obtain the discounts, coupons, and other services needed and then if desired proceed to checkout (via a swipe gesture or other authenticating mechanism) or again exit the app and proceed with the cart which may now contain the item carted and discount collect to another application (e.g., messaging application). In FIG. 3, UI 302d illustrates a user who then proceeds to message a person regarding the items carted. As illustrated in FIG. 3, the user may proceed directly from the discount e-commerce marketplace site to the messaging application 314. The message can be to a friend, social media contact, relative, or other contact which can provide feedback, provide funding (e.g., Dad), a recommendation, or the like on the product. In some instances, the user may also communicate with a rating application like Yelp for product review, or other payment provider application (e.g., Venmo) for the payment of the product by the user, split among users or another user. Additionally, a multi-account transaction may be created by and pay for by a single user, a user distinct from the creator may pay for the transaction, or a group of users may pay for the transaction. The funding can then be pulled from one or more accounts based on the preferences disclosed with the account. The user(s) may checkout directly using a gesture, combination of gestures and/or using security pattern(s) for authentication and processing.

Note that other applications may be frequented during the transaction and those illustrated above and in conjunction with FIG. 3 are for exemplary purposes. Also, note that the number of swipes used above are also for exemplary purposes and more or less swipes and/or other gestures may be used to communicate and transact. In addition, although a swipe gesture is used here, other gestures may be used to communicate between applications. For example, a single tap, double tap, squeeze, pattern, shape or other gesture or combination of gestures may be used for the communication.

Figures 4A, 4B, 4C:
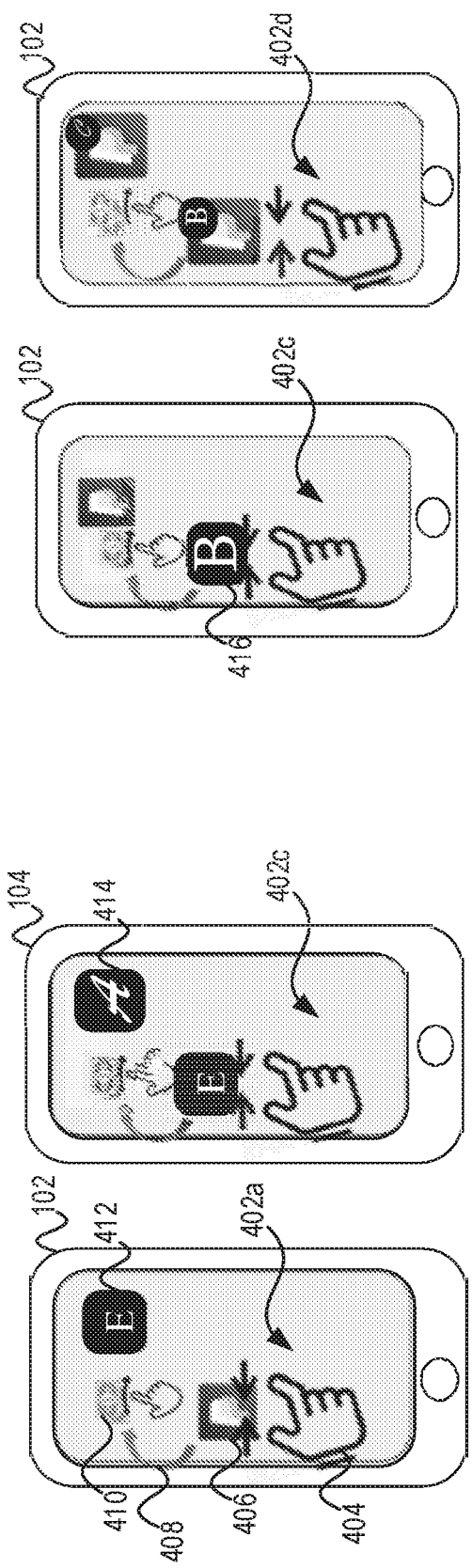
FIGS. 4A-4C illustrate other communications for performing gesture-based unified multi-marketplace transactions.

For example, FIGS. 4A-4C illustrates other communications for performing gesture-based unified multi-marketplace transactions. In particular, FIGS. 4A-4C illustrate various instances where a gesture is used to communicate between marketplaces on a user device 102. FIG. 4A begins with UI402a, which illustrates a user device 102 in a home state where the payment provider account is used for a transaction. In UI402, a PayPal icon 406 is used as the exemplary payment provider account. In this embodiment, the gesture used to enable the communication between the marketplaces is a squeeze gesture 404. The squeeze gesture 404 is essentially introduced to "squeeze" funds from a payment provider account (e.g., by squeezing the PayPal icon 406). The squeeze gesture 404 may be used in conjunction a swipe gesture 408 to transfer the money 410 to a secondary account 412. The secondary account, as illustrated in FIG. 4A, can be an e-commerce marketplace merchant 412 providing merchandise for purchase. In one embodiment, the user interested in transacting with e-commerce marketplace merchant 412 can then use a squeeze gesture 404 to transfer funds from the payment provider icon 406 to the e-commerce marketplace merchant 412 using a secondary swipe gesture 408 indicating the corresponding marketplace that will receive the funds. Upon receipt of the funds in the e-commerce marketplace site, the user may browse, cart, or purchase one or more items for sale. If additional items are desired for purchase, or the user is interested in comparing with a secondary merchant, the user may then squeeze 404 and swipe 408 from the e-commerce marketplace 412, to a secondary marketplace (e.g., via secondary e-commerce marketplace icon 414). At the secondary marketplace 414, the user can compare items, browse other items, cart, or purchase other. As indicated, to get the funding to purchase at the secondary marketplace 414, the user can begin at the first e-commerce 412 and then use the squeeze 404 and swipe 408 gestures to transfer the funds. Alternatively, the payment provider icon 406 may also provide the funding for the purchase at e-commerce marketplace 412 using gestures as well and/or the e-commerce marketplace 410, 412 can transfer back to the payment provider icon 404.

Note that the gestures disclosed above and in conjunction with FIGS. 3 and 4A-4B are not so limited and other gestures are possible. In addition, the marketplace transactions described, are also not limited to e-commerce applications and merchants. Transaction and communication via user device 102 can exist between various vendors, discount entities, merchants, charities, financial instructions, and the like. In addition, processing fees, customer service, and dispute resolution may be handles by the unifying entity (e.g., service provider).

For example, FIG. 4B illustrates the communication on a user device 102 between financial institutions. As illustrated in FIG. 4B, the communication may begin with the action to transfer of funds between marketplaces from a financial institution such as a bank (e.g., bank icon 416). In UI402c, an illustration of a transferable amount from a bank account to the payment provider account is provided. Again, illustrated here is the use of gestures to illustrate the communication between the marketplaces, in particular, a squeeze 404 and swipe 408 gesture are used here. Indicated in UI402d, is a second transfer of funds from the payment provider account funded and/or tied to the first bank account to another payment provider account tied to another financial institution.

Note that in some instances, the same payment provider may be tied to two different institutions and the transaction can entail the transfer between them through the use of a gesture on the payment provider icon 406. Alternatively, the user can transfer (e.g., squeezing out) a monetary amount from their payment provider account to another user's payment provider account which is tied to a different (or same) financial institution or bank.

Turning to FIG. 4C, another example of the communication between marketplaces using gestures is presented. In particular, FIG. 4C presents a UI402d a digital remittance provider (e.g., Xoom) used as the source of income to finance, transfer, or transact with another using a gesture. As illustrated in FIG. 4C, in this instance, the transaction is between the digital remittance provider and an individual. The individual may be selected from the user device contact list, using an email, from a social media friend, etc. In addition, an amount to transfer may be determined by the amount of squeeze (e.g., length of time, pressure, or other exertion that is added input on the icon). Alternatively, the number of swipes, a digital pad, as well as other methods may be contemplated to modify the dollar amount. Additionally, the amount may be predetermined using probabilistic analysis, machine learning, or other predictive analysis based on historical data retrieved from the user profile, social network, and/or stored information collected via sensors located on the device.

As indicated, FIGS. 3-4 provide exemplary communications for unified multi-marketplace transactions. Inclusive in FIGS. 3-4 were a few gestures illustrating possible methods for performing such transactions. In addition to those gestures illustrated in FIGS. 3-4, other gestures and/or combination of gestures are possible. As an example, FIGS. 5A-5H illustrates various gestures used for performing gesture-based unified multi-marketplace transactions. In particular, FIG. 5 illustrates various user gestures and user device movements possible for the communication, authentication, processing, and completion of a transaction.

Figure 5A:
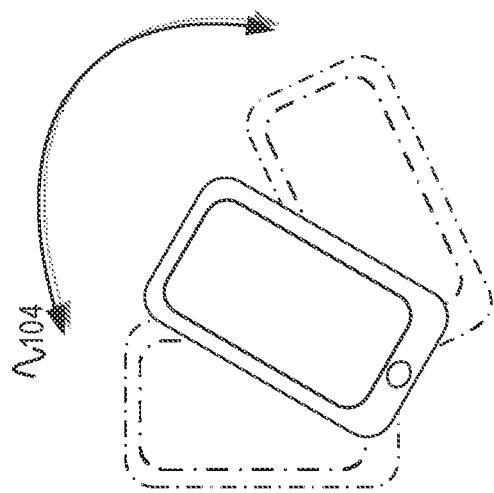
FIGS. 5A-5H illustrates various gestures used for performing gesture-based unified multi-marketplace transactions.

In some embodiments, a user transaction may be completed between a user and merchant, POS system, another user, online system, or between applications using a movement of the device. As an example, the user may be involved in a unified multi-marketplace purchase transaction with the product available for pick-up and payment at a merchant location. The user may complete the transaction, as illustrated in FIG. 5A, by turning the device in the direction of the merchant so as to indicate the "pouring of funds" out of the device and to a merchant point of sale system. Similarly this gesturer can occur between two user devices and/or a combination of device. The process that may be used for this type of transaction, is detailed below and described in conjunction with FIG. 6.

Figure 5B:
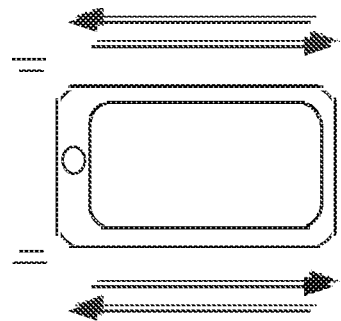

Turning to FIG. 5B, another gesture or device movement is introduced for transacting which includes the movement of the device in an upward and downward direction such as in a shaking fashion. The device shake may similarly occur when transacting between applications on the user device 102, between two user devices, between the user device and a POS at a merchant location, etc.

Figure 5C:
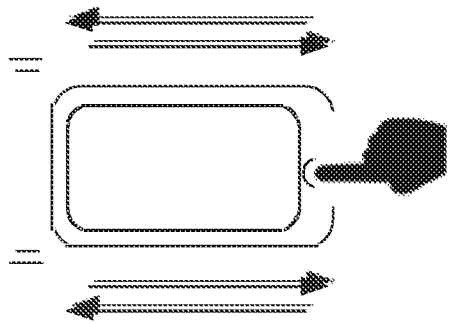

FIG. 5C, extends the concept further by combining two gestures including a "shake" and biometric authentication. As an example, the user is "shaking" money from his account to his friends account while simultaneously holding the home button for a biometric finger scan authentication. Additionally or alternatively, the "shake" and/or finger print scan can occur serially or in parallel.

Figure 5D:
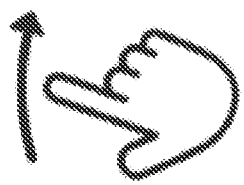
Figure 5E:
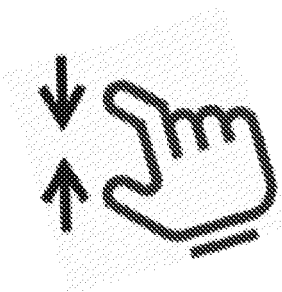
Figure 5F:
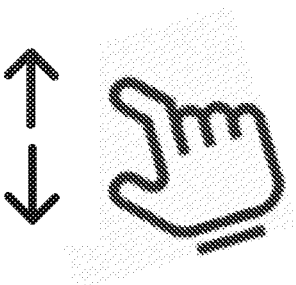
Figure 5G:
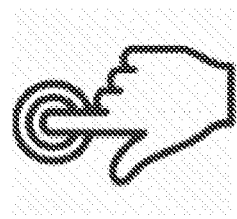
Figure 5H:
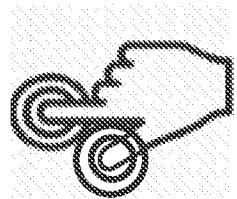

FIGS. 5D-5H illustrate on screen gestures that may also be used in the unified multi-marketplace transactions. As indicated above, a swipe as illustrated in FIG. 5D may be used to designate the transfer from a first application to a second application. FIG. 5E illustrates the pinch or squeeze to signify the squeezing money from an account. FIG. 5F illustrates a stretching gesture. The stretching gesture may be used to increase the amount or a first finger indicating a first account and the second finger stretched to the second account, etc. FIG. 5G illustrates a tap, push, depression, or other input that may be used to initiate, transfer, complete, of authenticate the transaction. FIG. 5H uses at least two fingers for the command. Note that these gestures are illustrated for exemplary purposes and other gestures may be contemplated. In addition, the gestures may be performed singly or in combination. As example, the user may swipe funds from one account to another while looking at the user device camera for authentication. As another example, the user may select the accounts though a touch or tap input and then draw an authentication pattern on the screen. Still as another example, a unique pattern identified is designated and used as the gesture for each pair of accounts to be used.

In addition, the gestures may be used for other transactions or actions between applications. As an example, the squeeze gesture may be used for various other applications. In on embodiment, a gesture such as the squeeze gesture may be used for messaging and communication. For example, the messaging app may be squeezed which can be used as an indication that the user wants to message a contact. The squeeze can enable a unified communication between other social media applications (e.g., Facebook, WhatsApp, twitter, etc.) and contacts to enable the selection of the contacts for messaging. Alternatively, a social media application may be directly squeezed for initiating a messaging session. In addition, for messages received, a squeeze of the messaging application can cause the message to "pop out" to enable reading and responding.

In another embodiment, a gesture such as a squeeze may be used in sharing content such as news. For example, a news application may be squeezed to pop out key headlines. The applications can then again be unified and shared with friends. In this embodiment, a combination of gestures may be used. For example, the squeeze may release the news while a swipe may send headline to a contact or social media group.

Still in another embodiment, a gesture such as the squeeze gesture may be used on a restaurant app. The squeeze releases the menu which can be used for ordering food. The menu enables the UI to appear and items may be selected for purchase. A secondary gesture such as a swipe may then be used for selecting a delivery place from the maps application and still yet another gesture may be used to complete the purchase though a gesture to a payment provider application or financial institution.

Still in yet another embodiment, a gestures such as a squeeze may be used to pop out relevant discounts and coupons from a discount e-commerce marketplace and then a secondary swipe may be used to transfer the coupon to an e-commerce application where the coupon may be used. Other gestures may also be used for the payment and transaction processing with a financial institution or payment provider.

Still yet in other embodiments, the gestures may be used to pop out pictures from a gallery app and share with others using one or more gestures as described above and in conjunction with FIGS. 5A-5H. The gestures may similarly be used to squeeze out documents from a repository application (e.g., dropbox) or credit cards from a digital wallet.

Note that the specified gestures and uses are not limited to those described above as others may be contemplated.

Figure 6:
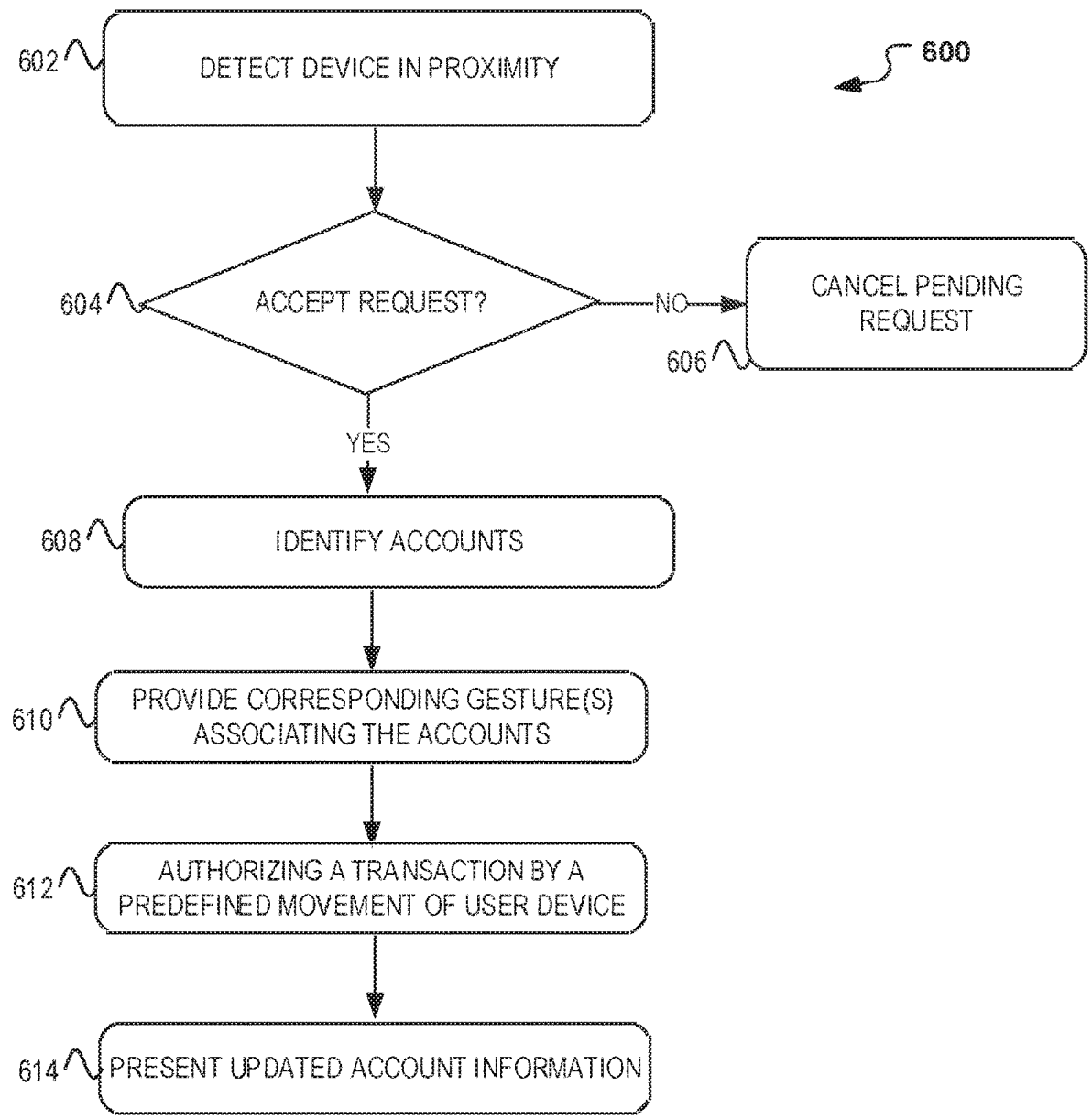
FIG. 6 illustrates a flow diagram of a method for completing a gesture-based unified multi-marketplace transaction.

To illustrate an exemplary use of such gestures, FIG. 6 illustrates an example process 600 for completing a gesture-based unified multi-marketplace transaction. In particular, FIG. 6 illustrates an example process for performing a multi-marketplace transaction at a merchant location. According to some embodiments, process 600 may include one or more of operations 602-614, which may be implemented, at least in part, in the form of executable code stored on a non-transitory, tangible, machine readable media that, when run on one or more hardware processors, may cause a system to perform one or more of the operations 602-614.

Process 600 begins with operation 602, where a user located at a merchant location is present for purchasing an item. At operation 602, the user device 102 associated with the user is detected in the proximity of a beacon, merchant device, or other detecting sensor associated with the merchant. Upon detection, the user device, at operation 604, may receive a notification of the desire for the merchant device to communicate with the device 102. The communication can entail the identification of the user device 102 and retrieval of user profile and other information associated with the user of the user device 102.

Note that in some instances, the detection of the user device 102 may not occur until the user is at checkout at the merchant point-of-sale system where Bluetooth, NFC, WiFi, or other short range communication may be used for the communication and transaction.

If the user desires to be connected to the merchant location, the user may accept the request and continue to operation 608 or alternatively cancel the request at operation 606. Note that a user may desire not communicate with the merchant device and still perform a unified marketplace transaction all within the device.

Returning to operation 608, the user associated with the user device 102 may accept the request to communicate with the merchant device at which point user profile information, payment information, and other relevant customer information may be retrieved. Once identified, the user is able to navigate through various marketplaces. Navigation can occur using a series of gestures as indicated in operation 610. For example, the user with the user device 102 transfer funds via a set of gestures from a payment provider account to a discount e-commerce marketplace. At the discount e-commerce marketplace, the user may purchase or collect discounts and/or coupons for use. The discounts may be collected using a shopping cart for example or by use of a swipe, tap, or other gesture that indicates the selection and transfer to another application for use. After communication and transaction with other applications is complete, the user device 102 may then be used for the purchase of an item at a POS system at the merchant location. The item may be selected on the user device using a corresponding merchant app, or physically picked up at the location. At the POS system, a gesture such as a swipe the shopping cart toward the merchant POS system may be used for the transaction. Alternatively, the prior detection of the user device may automatically load the merchandise one the user arrives at the POS in which case the gesture may include a squeeze of funds toward the POS system.

In some embodiments, further to the gesture provided for authorizing the transaction, a secondary gesture or movement of the device may be provided at operation 612 for authorization. For example, at operation 612, the user device may be tilted so as to "pour" the money out of the user device and to the POS. Alternatively, the user may scan a fingertip and shake the phone, tilt the phone and present a unique digital pattern, or other similar combination of gestures and/or movements providing confirmation and authorization of the purchase. Once the authorization is received and transaction approved, the user device may be presented with a notification of the completed transaction and/or updated account information at operation 614.

Note that FIG. 6 provides an exemplary method for purchasing merchandise using a unified multi-marketplace process. However, more or less operations may be used as well as gestures, movements, and methods for authentication and authorization of the user device and transaction.

Figure 7:
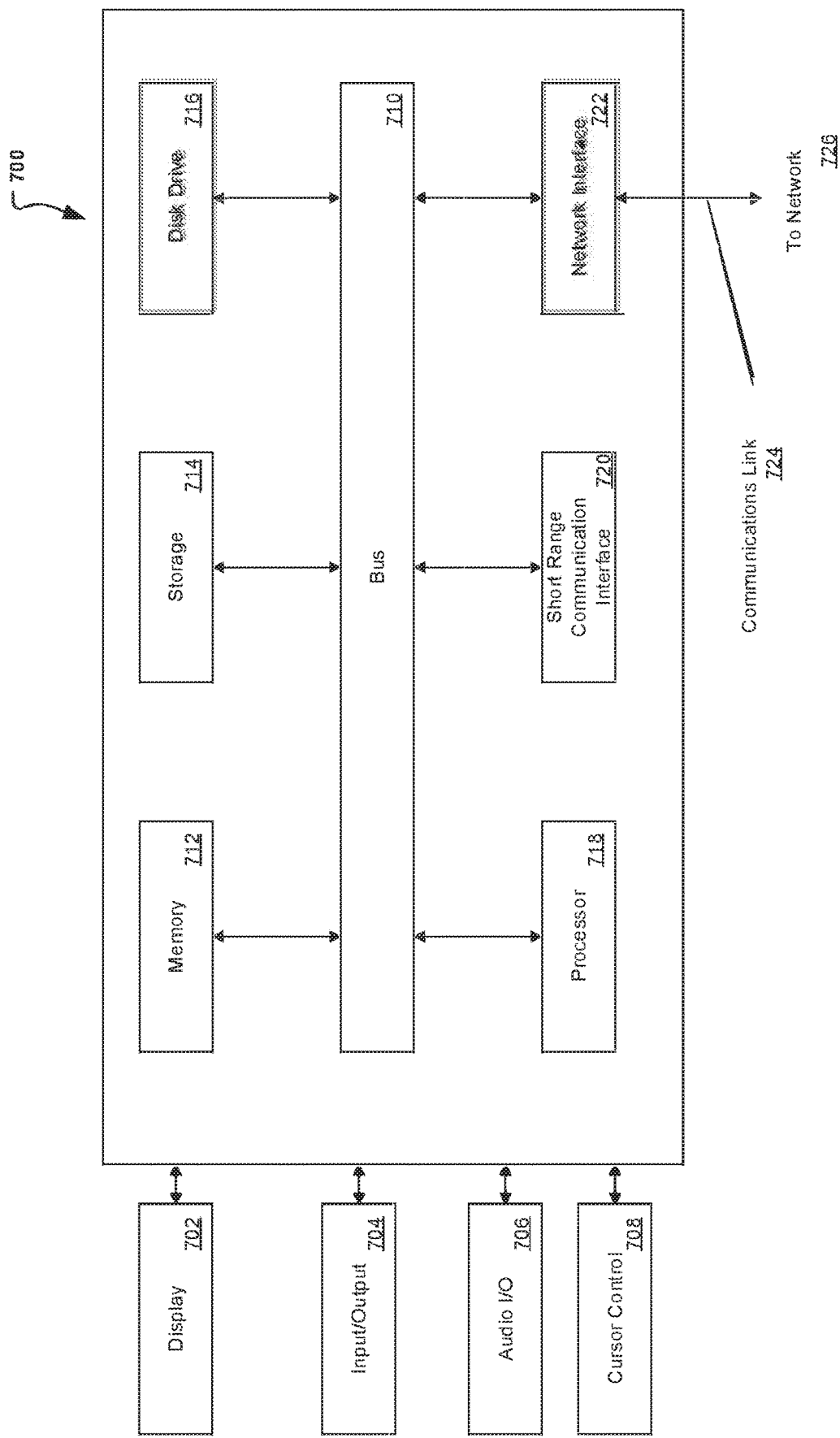
FIG. 7 illustrates an example block diagram of a computer system suitable for implementing one or more devices of the communication systems of FIGS. 1-6.

FIG. 7 illustrates an example computer system 700 in block diagram format suitable for implementing on one or more devices of the system in FIGS. 1-6. In various implementations, a device that includes computer system 700 may comprise a personal computing device (e.g., a smart or mobile device, a computing tablet, a personal computer, laptop, wearable device, PDA, etc.) that is capable of communicating with a network 826 (e.g., network 250). A service provider and/or a content provider may utilize a network computing device (e.g., a network server) capable of communicating with the network. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 other devices, such as another user device, a merchant server, an email server, application service provider, web server, a payment provider server, an ATM server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination). Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WiFi, Bluetooth®, Bluetooth Low Energy (BLE), infrared, NFC, etc.).

Short range communications interface 720, in various embodiments, may be configured to detect other devices (e.g., user device 102, personal device 104, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short range communications protocol, such as WiFi, and join the local area network. In some examples, computer system 700 may discover and/or communicate with other devices that are a part of the local area network using short range communications interface 820. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A device, comprising:
   a non-transitory memory; and
   one or more hardware processors coupled to the non-transitory memory and configured to read instructions from the non-transitory memory to cause the device to perform operations comprising:
      displaying, via a graphical user interface of the device, a first icon corresponding to an account of a user of the device and a second icon corresponding to a marketplace;
      detecting gestures inputted via the graphical user interface involving the first icon and the second icon, the gestures comprising a movement of a graphical element toward the second icon, the graphical element generated in response to a squeeze of the first icon;
      associating, in response to the detected gestures, the account with marketplace account information;
      authorizing a transaction with the marketplace using the account, wherein an amount of funds corresponding to the transaction is associated with an amount of the squeeze of the first icon; and
      in response to the authorizing, presenting, via the graphical user interface, updated account information and marketplace account information.

2. The device of claim 1, wherein the movement of the graphical element toward the second icon includes a swipe of the graphical element toward the second icon.

3. The device of claim 2, wherein the operations further comprise:
   detecting another gesture inputted via the graphical user interface, the another gesture including a movement of the graphical element toward a third icon; wherein account information associated with the third icon is further updated to include the transaction with the marketplace.

4. The device of claim 3, wherein the second icon comprises a visual representation of a first e-commerce marketplace and the third icon comprises a visual representation of a second e-commerce marketplace.

5. The device of claim 2, wherein the graphical element comprises a visual representation of money or funds.

6. The device of claim 1, wherein the squeeze of the first icon further generates a discount at the marketplace associated with the second icon.

7. The device of claim 1, wherein the amount of the squeeze comprises a pressure associated with the squeeze or a length of time associated with the squeeze.

8. The device of claim 1, wherein the amount of funds is predetermined based on a predictive analysis.

9. A method comprising:
displaying, via a graphical user interface of a device, a first icon corresponding to an account of a user of the device and a second icon corresponding to a marketplace;
detecting gestures inputted via the graphical user interface involving the first icon and the second icon, the gestures comprising a movement of a graphical element toward the second icon, the graphical element generated in response to a squeeze of the first icon;
associating, after the detecting, the account with marketplace account information;
authorizing a transaction with the marketplace using the account, wherein an amount of funds corresponding to the transaction is associated with an amount of the squeeze of the first icon; and
in response to the authorizing, presenting, via the graphical user interface, updated account information and marketplace account information.

10. The method of claim 9, wherein the movement of the graphical element toward the second icon includes a swipe of the graphical element toward the second icon.

11. The method of claim 10, further comprising:
detecting another gesture inputted via the graphical user interface, the another gesture including a movement of the graphical element toward a third icon; wherein account information associated with the third icon is further updated to include the transaction with the marketplace.

12. The method of claim 11, wherein the second icon comprises a visual representation of a first e-commerce marketplace and the third icon comprises a visual representation of a second e-commerce marketplace.

13. The method of claim 10, wherein the graphical element comprises a visual representation of money or funds.

14. The method of claim 9, wherein the squeeze of the first icon further generates a discount at the marketplace associated with the second icon.

15. The method of claim 9, wherein the amount of the squeeze comprises a pressure associated with the squeeze or a length of time associated with the squeeze.

16. The method of claim 9, wherein the amount of funds is predetermined based on a predictive analysis.

17. A non-transitory machine-readable medium having stored thereon machine-readable instructions executable to cause a machine to perform operations comprising:
displaying, via a graphical user interface of a device, a first icon corresponding to an account of a user of the device and a second icon corresponding to a marketplace;
detecting gestures inputted via the graphical user interface involving the first icon and the second icon, the gestures comprising a movement of a graphical element toward the second icon, the graphical element generated in response to a squeeze of the first icon;
associating, based on the detecting of the gestures, the account with marketplace account information;
authorizing a transaction with the marketplace using the account, wherein an amount of funds corresponding to the transaction is associated with an amount of the squeeze of the first icon; and
in response to the authorizing, presenting, via the graphical user interface, updated account information and marketplace account information.

18. The non-transitory machine-readable medium of claim 17, wherein the movement of the graphical element toward the second icon includes a swipe of the graphical element toward the second icon.

19. The non-transitory machine-readable medium of claim 17, wherein the operations further comprise:
detecting another gesture inputted via the graphical user interface, the another gesture including a movement of the graphical element toward a third icon; wherein account information associated with the third icon is further updated to include the transaction with the marketplace.

20. The non-transitory machine-readable medium of claim 19, wherein the second icon comprises a visual representation of a first e-commerce marketplace and the third icon comprises a visual representation of a second e-commerce marketplace.

21. The non-transitory machine-readable medium of claim 17, wherein the graphical element comprises a visual representation of money or funds, and wherein the amount of the squeeze comprises a pressure associated with the squeeze or a length of time associated with the squeeze.

* * * * *